(12) United States Patent
Goetz

(10) Patent No.: US 7,064,651 B2
(45) Date of Patent: Jun. 20, 2006

(54) AUTOMATIC VEHICLE THEFT PREVENTION SYSTEM

(76) Inventor: Joseph R. Goetz, 550 E. Encinas Ave., Gilbert, AZ (US) 85234

( * ) Notice: Subject to any disclaimer, the term of this patent is extended or adjusted under 35 U.S.C. 154(b) by 1078 days.

(21) Appl. No.: 09/834,499

(22) Filed: Apr. 12, 2001

(65) Prior Publication Data

US 2001/0035812 A1 Nov. 1, 2001

Related U.S. Application Data

(60) Provisional application No. 60/196,343, filed on Apr. 12, 2000.

(51) Int. Cl.
  H04Q 9/00 (2006.01)
  H01H 27/00 (2006.01)
  H01H 47/00 (2006.01)
(52) U.S. Cl. .................. 340/5.61; 340/5.62; 307/10.3; 307/10.5
(58) Field of Classification Search ............... 307/10.5, 307/10.3; 340/5.61, 5.62
  See application file for complete search history.

(56) References Cited

U.S. PATENT DOCUMENTS

| | | | |
|---|---|---|---|
| 3,689,885 A | 9/1972 | Kaplan et al. | |
| 3,784,839 A | 1/1974 | Weber | |
| 3,864,651 A * | 2/1975 | Flanagan | 335/186 |
| 3,891,980 A | 6/1975 | Lewis et al. | |
| 3,914,762 A | 10/1975 | Klensch | |
| 3,970,846 A | 7/1976 | Schofield, Jr. et al. | |
| 4,123,754 A | 10/1978 | Armstrong | |
| 4,189,712 A | 2/1980 | Lemelson | |
| 4,242,576 A | 12/1980 | Lundgren | |
| 4,263,595 A | 4/1981 | Vogel | |
| 4,291,237 A | 9/1981 | Kitano | |
| 4,366,466 A | 12/1982 | Lutz | |
| 4,412,267 A * | 10/1983 | Hansen | 361/94 |
| 4,438,426 A | 3/1984 | Adkins | |
| 4,453,161 A | 6/1984 | Lemelson | |
| 4,553,511 A | 11/1985 | Hayakawa et al. | |
| 4,580,041 A | 4/1986 | Walton | |
| 4,650,981 A | 3/1987 | Foletta | |
| 4,672,225 A | 6/1987 | Hanisko et al. | |
| 4,672,375 A | 6/1987 | Mochida et al. | |
| 4,682,062 A | 7/1987 | Weinberger | |
| 4,719,460 A | 1/1988 | Takeuchi et al. | |

(Continued)

OTHER PUBLICATIONS

Vehicle Access, Philips Semiconductors, Copyright 2001, Royal Philips Electronics, http://www-us.semiconductors.philips.com/identification/applications/vaccess/ Apr. 5, 2001.

(Continued)

*Primary Examiner*—Jeffery Hofsass
*Assistant Examiner*—Scott Au

(57) ABSTRACT

An automatic vehicle theft prevention system (52) selectively enables an ignition system (22) of a vehicle (20). The system (52) includes an interrogator circuit (54) that generates and radiates an excitation signal (68). A transponder circuit (56) in close proximity to the interrogator circuit (54), and separate from an ignition key (48) of the ignition system (22), detects the excitation signal (68) and modulates the excitation signal (68) to produce the return signal (74) containing an identification code (76) for the transponder circuit (56). The return signal (74) is radiated from the transponder circuit (56) and received at the interrogator circuit (54). When a controller (58), in communication with the interrogator (54), detects the identification code (76) in the return signal (74), the controller (58) actuates a relay (60) to an enable mode to enable the ignition system (22).

13 Claims, 2 Drawing Sheets

U.S. PATENT DOCUMENTS

| | | | |
|---|---|---|---|
| 4,733,638 A | | 3/1988 | Anderson |
| 4,897,644 A | | 1/1990 | Hirano |
| 4,980,680 A | | 12/1990 | Knoll et al. |
| 5,040,212 A | * | 8/1991 | Bethards ................ 704/246 |
| 5,155,494 A | * | 10/1992 | Bryant et al. ............ 343/713 |
| 5,241,160 A | | 8/1993 | Bashan et al. |
| 5,241,161 A | | 8/1993 | Zuta |
| 5,311,186 A | | 5/1994 | Utsu et al. |
| 5,313,189 A | * | 5/1994 | Dodd et al. ............. 340/433 |
| 5,414,624 A | | 5/1995 | Anthonyson |
| 5,451,925 A | | 9/1995 | Le |
| 5,532,689 A | | 7/1996 | Bueno |
| 5,640,003 A | | 6/1997 | Makino |
| 5,656,867 A | | 8/1997 | Kokubu |
| 5,703,414 A | | 12/1997 | Mutoh et al. |
| 5,708,307 A | * | 1/1998 | Iijima et al. ............. 307/10.5 |
| 5,801,614 A | | 9/1998 | Kokubu |
| 5,945,906 A | * | 8/1999 | Onuma .................... 340/5.62 |
| 5,952,937 A | * | 9/1999 | Koopman et al. ..... 340/825.72 |
| 6,112,152 A | * | 8/2000 | Tuttle ...................... 701/115 |
| 6,175,308 B1 | * | 1/2001 | Tallman et al. ........ 340/539.11 |
| 6,285,948 B1 | * | 9/2001 | Takagi et al. ............ 701/115 |
| 6,414,586 B1 | * | 7/2002 | Yoshizawa ............... 340/5.2 |
| 6,580,972 B1 | * | 6/2003 | Strohbeck ................ 701/1 |

OTHER PUBLICATIONS

Immobilization, Philips Semiconductors, Royal Philips Electronics, http://www-us.semiconductors.philips.com/identification/applications/vaccess/immobilization/ Apr. 5, 2001.

Success, Philips Semiconductors, Copyright 2001, Royal Philips Electronics, http://www-us.semiconductors.philips.com/identification/competence/success/s4/ Apr. 5, 2001.

Philips Semiconductors, "Vehicle Access," Copyright 2001 Royal Philips Electronics.

Philips Semiconductors, "Immobilization," Copyright 2001 Royal Philips Electronics.

Philips Semiconductors, "Success," Copyright 2001 Royal Philips Electronics.

* cited by examiner

AUTOMATIC VEHICLE THEFT PREVENTION SYSTEM

RELATED INVENTION

The present invention claims priority under 35 U.S.C. §119(e) to: "Automatic Vehicle Theft Prevention System," U.S. Provisional Patent Application Ser. No. 60/196,343, filed 12, Apr. 2000, which is incorporated by reference herein.

TECHNICAL FIELD OF THE INVENTION

The present invention relates to the field of vehicle theft prevention systems. More specifically, the present invention relates to a system that selectively enables the ignition system of a vehicle.

BACKGROUND OF THE INVENTION

In a conventional motor vehicle, the internal combustion engine of the vehicle is "started" by an ignition system that includes an electrical starter motor, a battery power source, and a key-operated ignition switch. When the ignition switch is closed, current is supplied by the battery power source to the starter motor, which in turn, "starts" the internal combustion engine.

Security of the ignition system is dependent upon the integrity of the key-operated ignition switch. By shorting the ignition switch, the ignition system circuitry can be closed without the need of a key to close the ignition switch. This is known as "hot wiring" starting. Shorting the ignition switch is frequently the method used to start the internal combustion engine during theft of a motor vehicle. The switch is typically located on the steering column of the vehicle which is surrounded by a circular metal housing. By breaking open the metal housing, the switch may thereafter be quickly and easily shorted. Alternatively, the key switch may be broken by the forceful insertion of an object such as a screwdriver into the keyhole and the screwdriver thereafter effectively acts as a key to close the switch.

Several systems have been developed which attempt to make theft of the vehicle more difficult. Such systems include vehicle alarms that sound a siren or horn when a vehicle is broken into and/or prevent the vehicle from starting. Other systems are mechanical devices that secure to the steering column and/or the gas pedal to prevent their operation even when the car is hot wired. Unfortunately, audible alarms and mechanical devices require activation or installation by the driver. As such, they are often forgotten by the vehicle owner, and not enabled. In addition, audible alarms have become so commonplace that they are frequently ignored. Thus, these prior art audible alarms and mechanical devices are ineffective for satisfactorily protecting vehicles against theft.

Another system, known as a transponder-based immobilizer system, includes a contactless data carrier (transponder) embedded in the vehicle key. The transponder is powered by a radio frequency field generated by a radio frequency identification (RFID) reader in the vehicle. The transponder sends an authorization code to the RFID reader, which signals engine management electronics to immobilize the car if it does not find or does not accept the transmitted authorization code. The transponder-based immobilizer system is advantageous over prior art driver-activated alarms and mechanical devices because it requires no intervention by the driver in order to activate the immobilizer system.

While an immobilizer system can prevent theft of a vehicle by merely shorting the ignition key switch, such a system suffers from several disadvantages. For example, since the transponder is embedded on the key, the vehicle owner cannot readily have a duplicate key made. Rather, the vehicle owner is required to obtain duplicate keys through the vehicle dealer or through an authorized provider, which is inconvenient for the vehicle owner and significantly more expensive than merely having a duplicate key made at a local hardware store.

In addition, if the key with the embedded transponder is stolen, the thief can still start the car. Such situations arise in a home robbery where the thief finds the vehicle keys setting in the home or in a car jacking in which the thief takes the key from the driver.

Yet another problem arises with the prior art transponder-based immobilizer systems in that these systems are only provided in new vehicles by the original equipment manufacturer. As such, individuals having older model vehicles, collectable vehicles, a fleet of vehicles, and such, cannot employ this technology to protect their vehicles.

SUMMARY OF THE INVENTION

Accordingly, it is an advantage of the present invention that an automatic vehicle theft prevention system is provided that protects the vehicle against theft without the need for human intervention.

It is another advantage of the present invention to provide an automatic theft prevention system that selectively enables the ignition system of a vehicle.

It is another advantage of the present invention to provide an automatic vehicle theft prevention system that is separate from an ignition key of a vehicle.

Yet another advantage of the present invention is to provide an automatic vehicle theft prevention system as a cost effective, aftermarket device for protecting older vehicles from theft.

The above and other advantages of the present invention are carried out in one form by an automatic vehicle theft prevention system for selectively enabling an ignition system of a vehicle, the ignition system being operable using an ignition key. The system includes an interrogator circuit having a signal generator for generating an excitation signal and an antenna coupled to the signal generator for radiating the excitation signal and receiving a return signal. A transponder circuit, separate from the ignition key, detects the excitation signal and radiates the return signal. The transponder circuit modulates the excitation signal to produce the return signal containing an identification code for the transponder circuit. A controller is in communication with the antenna and detects the identification code in the return signal. A relay is actuated to an enable mode by the controller when the controller detects the identification code, the relay being actuated to enable the ignition system.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION OF THE PREFERRED EMBODIMENTS

Figure 1:
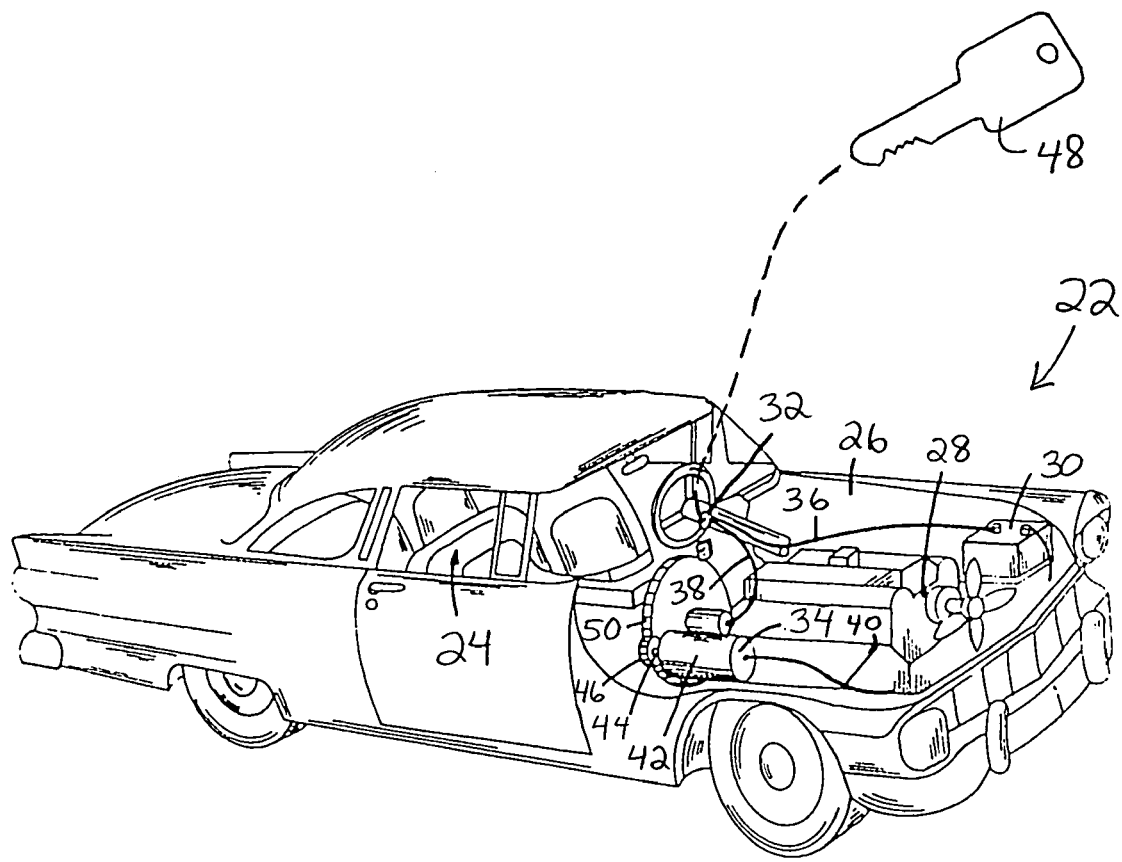
FIG. 1 shows a schematic view of a motor vehicle including an ignition system.

FIG. 1 shows a schematic view of a motor vehicle 20 including an ignition system, generally referred to by an arrow 22. Motor vehicle 20 includes a passenger compartment 24 and an engine compartment 26 containing an engine 28. Ignition system 22 includes a battery power source 30, an ignition key switch 32, and a starter mechanism, or motor, 34 connected in series by wires 36, 38, and 40. Starter motor 34 includes a housing 42 and an armature 44 with a pinion 46 attached to the end of armature 44.

In general, when ignition key switch 32 of ignition system 22 is closed by the insertion and rotation of a key 48 in switch 32, a magnetic field is produced inside starter motor 34 which, in turn, causes armature 44 to be translated and rotated. Translation of armature 44 causes pinion 46 to contact a flywheel 50. Rotation of flywheel 50 is caused by rotation of armature 44, and in turn, causes engine 28 of motor vehicle 20 to "start".

Figure 2:
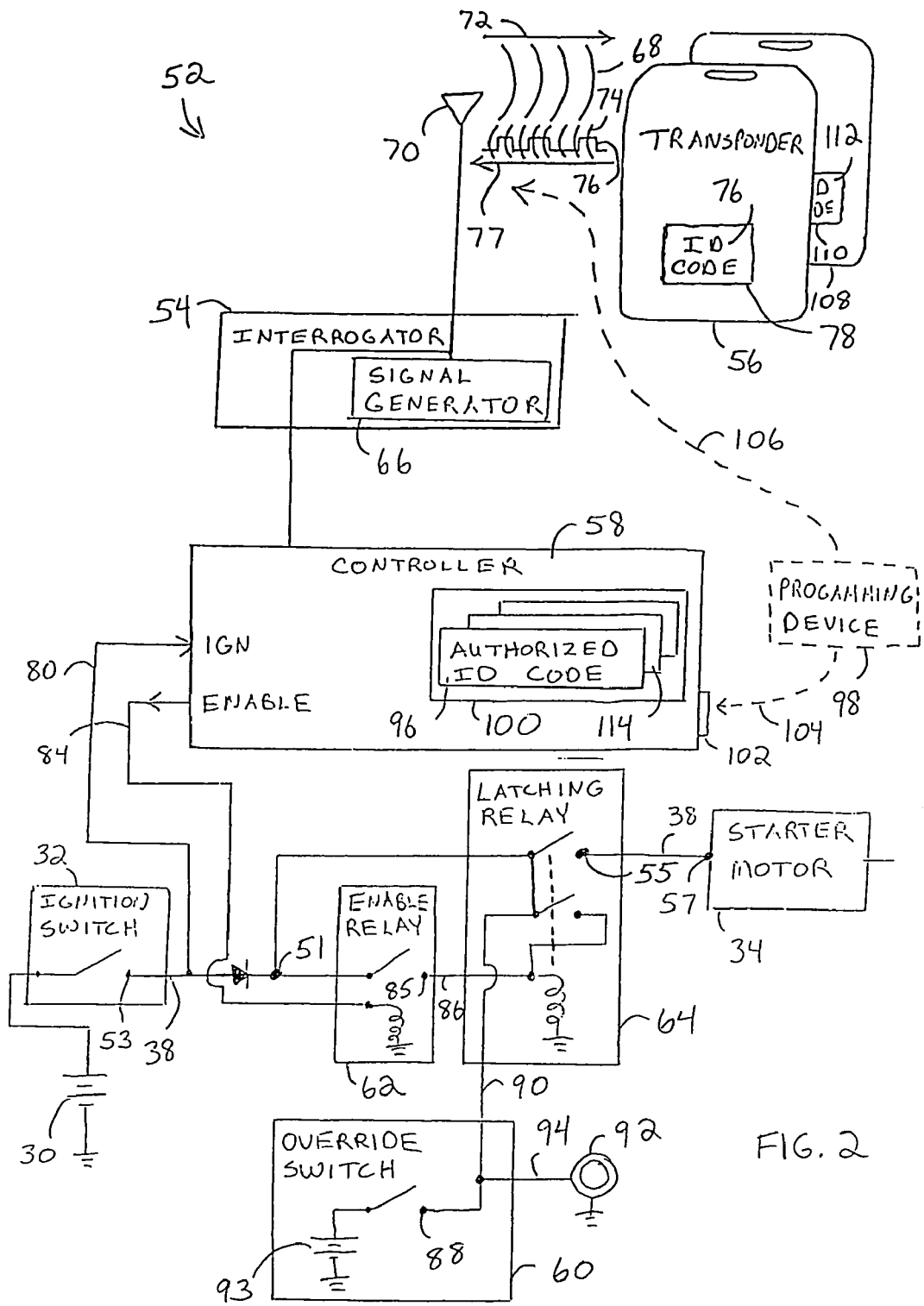
FIG. 2 shows a block diagram of an automatic vehicle theft prevention system interconnected with the ignition system of the motor vehicle in accordance with a preferred embodiment of the present invention.

FIG. 2 shows a block diagram of an automatic vehicle theft prevention system 52 interconnected with ignition system 22 of the motor vehicle 20 (FIG. 1) in accordance with a preferred embodiment of the present invention. System 52 is especially suited as an aftermarket device for cost effectively enhancing the integrity of the ignition systems of older model vehicles, collectable vehicles, and the like.

Theft prevention system 52 is interconnected in series between ignition key switch 32 and starter motor 34 along wire 38 of an existing motor vehicle, such as motor vehicle 20 (FIG. 1). In particular, system 52 includes an input 51 configured to be coupled to an ignition switch output 53 of ignition switch 32. System 52 further includes an output 55 configured to be coupled to a starter motor input 57 of starter motor 34.

Generally, vehicle theft prevention system 52 includes an interrogator circuit 54, in radio communication with a transponder circuit 56. A controller 58, in communication with interrogator circuit 54, is configured to selectively actuate an enable relay 62. Enable relay 62, in turn, actuates a latching relay 64. An override switch 60 is coupled to an input of latching relay 64, which when activated, causes latching relay 64 to remain in a latched state only following actuation of latching relay 64 by enable relay 62.

Override switch 60, enable relay 62, and latching relay 64 are normally in an open position, as shown, to prevent operation of motor vehicle 20. When each of override switch 60, enable relay 62, and latching relay 64 are in an open position, an open circuit is created between ignition switch 32 and starter motor 34 along wire 38 so that ignition system 22 (FIG. 1) is disabled so that engine 26 (FIG. 1) cannot be started. Vehicle theft prevention system 52 is configured to enable ignition system 22 to start engine 26 (FIG. 1) without the need for human intervention by selectively actuating enable relay 62, which in turn, actuates latching relay 64, as discussed below.

Interrogator circuit 54 includes a signal generator, or coil, 66 for generating an excitation signal 68 and an antenna 70 for radiating excitation signal 68, as indicated by an arrow 72. Transponder circuit 56 detects and modulates excitation signal 68 to produce a return signal 74 containing an identification code 76 that identifies transponder circuit 56. Return signal 74 is radiated from transponder circuit 56, as indicated by an arrow 77.

Interrogator circuit 54 and transponder circuit 56 employ a radio frequency identification (RFID) technology. RFID is a technology that uses contactless communication to identify objects, to store data or values, or to secure information and access without physical or visual contact between interrogator circuit 54 and transponder circuit 56. Interrogator circuit 54 is commonly known as a data reader or a proximity reader.

In a preferred embodiment, excitation signal 68 is a continuous 125 kHz electromagnetic field radiated from signal generator 66. A coil (not shown) in transponder circuit 56 transmits identification code 76 using a 62.5 kHz electromagnetic field, one-half the value of excitation signal 68. The 62.5 kHz electromagnetic field, known as return signal 74, acts as an analog radio frequency carrier for identification code 76. Although the present invention employs a 125 kHz electromagnetic field, other frequencies commonly used for RFID and contactless data carrier may be employed. These other common frequencies include, for example, 2 to 15 MHz, 455 MHz, and 2.45 GHz.

Transponder circuit 56 is a mobile RFID data carrier that includes a memory element 78 containing identification code 76 and a transceiver, or coil (not shown) in a plastic housing unit or plastic card. Transponder circuit 56 may also include additional functions to secure, protect, or select access to transponder circuit 56, as known to those skilled in the art. Transponder circuit 56, including a transponder/receiver pair and memory element 78, is variously referred to as a tag, card, transponder, electronic label, code plate, and so forth.

Transponder circuit 56 contains no internal power source. Rather, transponder circuit 56 is externally powered and derives its power from the excitation signal 68, radiated from interrogator circuit 54. Since power is provided to transponder circuit 56 by excitation signal 68, there is no need for batteries inside transponder circuit. Thus, cost savings is achieved through the simplicity of design of transponder circuit 56 and because there is no need for battery replacement.

Transponder circuit 56 is separate from key 48 (FIG. 1). Consequently, the high cost to have special keys fabricated that include an embedded transponder circuit for use with their older model vehicles need not be incurred by the vehicle owner. Moreover, transponder circuit 56 is ideally kept disconnected from a key ring (not shown) to which key 48 is connected. Thus, transponder circuit 56 may be stored in a wallet, handbag, and so forth so that a thief having access to key 48, but not having access to transponder circuit 56, cannot start engine 26 (FIG. 1) of motor vehicle 20. For example, in the case of an attempted carjacking, the driver can merely shut off vehicle 20, leave key 48 in the ignition, and run away from vehicle 20 taking transponder circuit 56 with them in their wallet or purse. By the time a thief discontinues attempting to start vehicle 20, the driver will be safely away from vehicle 20. When the driver later returns, vehicle 20 might likely still be where the thief left it.

Controller 58 and signal generator 66 of interrogator 54 may be housed in a common housing within passenger compartment 24 (FIG. 1) or within engine compartment 26 (FIG. 1). However, since system 52 relies on proximity sensing, antenna 70 is configured for placement inside passenger compartment 24 (FIG. 1) of motor vehicle 20 (FIG. 1) preferably close to the driver side seat. For example, antenna 70 may be embedded inside the driver side seat cushion or beneath the seat cushion so that antenna 70 and transponder 56 are likely to be in close proximity, for example, within twenty inches, in order for interrogator circuit 70 to detect return signal 74.

A radio frequency (RF) receiver (not shown) of controller 58 is in communication with antenna 70 of interrogator circuit 54. In addition, controller 58 is in communication with an output of ignition key switch 32 via an ignition link 80 for detecting a closure and opening of ignition switch 32. Controller 58 may be powered via ignition link 80 from battery source 30 whenever ignition switch is closed. Alternatively, controller 58 may include nonvolatile memory, or separate batteries, so that controller 58 does not depend upon battery power source 30 and the closure of ignition key switch 32 for power.

As mentioned briefly above, controller 58 is configured to actuate enable relay 62. Thus, controller 58 is in communication with a coil of enable relay 62 via an enable link 84. In addition, an output 85 of enable relay 62 is in communication with a coil of latching relay 64 via a latching link 86. An output 88 of override switch 60 is also in communication with an input to latching relay 64 via a bypass link 90. Output 88 of override switch 60 further couples with an indicator 92 via an indicator link 94.

Override switch 60 may be a panel mounted button, toggle switch, and the like located inside passenger compartment 24 (FIG. 1) of motor vehicle 22 (FIG. 1). An input of override switch 60 is coupled to a low power source 93 which supplies power to bypass link 90 and indicator link 94 when override switch 60 is activated. Indicator 92 may be a lamp, a light emitting diode, a liquid crystal display, a speaker circuit, and the like located inside passenger compartment 24 that is energized when override switch 60 is activated, or closed (discussed below).

Controller 58 includes an input for receiving a predetermined authorized identification code 96 from an external programming device 98, shown in ghost form. A memory element 100 of controller 58 is in communication with the input for storing predetermined authorized identification code 96. In one embodiment, the input is a data port 102 configured for a wired interconnection 104 with programming device 98. In another embodiment, programming device 98 is a wireless transmitter, and the input is antenna 70 configured for radio frequency communication with programming device 98 over a wireless communication link 106.

Predetermined authorized identification code 96 corresponds to identification code 76. That is, when automatic vehicle theft prevention system 52 is installed into motor vehicle 20 (FIG. 1), controller 58 is programmed, using programming device 98, to recognize identification code 76 for transponder circuit 56. When controller 58 recognizes identification code 76 in return signal 74, controller 58 actuates system 52 in an enable mode (discussed below) to enable ignition system 22 (discussed below).

System 52 may be actuated to the enable mode by more than one transponder circuit so that more than one user is authorized to use motor vehicle 20 (FIG. 1). Such a scenario occurs when there are multiple drivers in a household, when vehicle 20 is one of a fleet of company owned vehicles that may be driven by a number of individuals, and so forth. In particular, the input of controller 58, either data port 102 or antenna 70, is configured to receive a number of predetermined authorized identification codes 96. Likewise, memory element 100 of controller 58 is configured to store the additional predetermined authorized identification codes.

By way of example, transponder circuit 56 is a first RFID data carrier and system 52 includes a second RFID data carrier transponder circuit 108, separate from key 48 (FIG. 1) and similar in function to transponder circuit 56. Second RFID data carrier 108, has a memory element 110 for storing a second identification code 112. A second predetermined authorized identification code 114, corresponding to second identification code 112, is received at the input of controller 58 and stored in memory element 100. With both of predetermined authorized identification codes 96 and 114 stored in memory element 98 of controller 58, when controller 58 detects either of identification codes 76 or 112, controller 58 actuates system 52 in the enable mode (discussed below) to enable ignition system 22 (discussed below).

In a preferred embodiment, controller 58 is programmed with predetermined authorized identification codes corresponding to particular transponder circuits 56. However, in an alternative embodiment, other RFID systems may be employed in which the transponder circuit is programmed with particular identification code, or both the transponder circuits and the controller are programmed with corresponding identification codes.

In operation, following installation of system 52 in series with ignition system 22 (FIG. 1) and following the programming of controller 58 with authorized identification codes 96 and 114, system 52 is set to a disable mode. That is, override switch 60, enable relay 62, and latching relay 64 are set to open positions, which effectively opens ignition system 22 circuitry so that ignition system 22 cannot be enabled and engine 28 (FIG. 1) cannot be started.

System 52 is maintained in this disable mode whenever controller 58 fails to detect either of identification codes 76 and 112. Thus, a thief is deterred from stealing motor vehicle 20 (FIG. 1) by hot wiring or forcing ignition switch 32, or even by using key 48. Another advantage of the present invention, is that when a driver stores transponder circuit 56 separate from key 48, for example, in his or her wallet or purse, a driver cannot inadvertently drive away without their wallet or purse because the ignition system cannot be enabled without first detecting one of identification codes 76 and 112 stored in transponder circuits 56 or 108.

Interrogator 54 substantially continuously generates and radiates excitation signal 68. Thus, in order to operate motor vehicle 20, the driver merely enters vehicle 20 carrying one of transponder circuits 56 and 108. System 52 is placed in an enable mode following an access decision by controller 58. More particularly, when a transponder circuit, for example transponder circuit 56, is moved close to antenna 70 such that antenna 70 receives return signal 74, interrogator circuit 54 passes return signal 74 on to the RF receiver of controller 58 for decoding. Controller 58 processes, error checks, and converts return signal 74 to a digital signal.

Controller 58 then attempts to match identification code 76 within the digitized return signal 74 with one of predetermined authorized identification codes 96 and 114 in memory element 100. When controller 58 detects a match, controller actuates enable relay 62. Enable relay 62 is a momentary relay indicating that an authorized transponder circuit 56 is present. Thus, enable relay 62 is actuated to a momentary closed state whenever a match is detected.

In response to the momentary actuation of enable relay 62, latching relay 64 is also actuated to a latched, or closed, state. Thus, latching relay is closed in response to a detected match by controller 58 which causes momentary closure of enable relay 62. As a convenience to the driver, latching relay 64 is adapted to remain latched even when motor vehicle 20 stalls, so that transponder circuit 56 need not be represented to interrogator 54. Latching relay 64 is reset whenever ignition switch 32 is turned off or deactivated, as detected via ignition link 80 by controller 58.

Accordingly, in response to the momentary closure of enable relay 62 and sustained closure of latching relay 64, a circuit path is formed from ignition switch output 53 through input 51 and latching relay 64 to output 55 and to input 57 of starter motor 34. This circuit path allows system 52 to be in the enable mode so that when key 48 (FIG. 1) is inserted in ignition switch 32 and turned, engine 28 (FIG. 1) of motor vehicle may be started. Whenever switch 32 is turned off using key 48, latching relay 64 opens and automatic vehicle theft prevention system 52 is placed back into the disable mode.

On occasion, is may be desirable to override system 52 such that ignition switch 32 is continuously enabled. Such a situation may arise, for example, when motor vehicle 20 (FIG. 1) is being turned over to an attendant for valet parking, when motor vehicle is in an automotive shop or at a carwash, and so forth. When a driver wishes to override system 52, the driver again enters vehicle 20 carrying one of transponder circuits 56 and 108. Again, controller 58 automatically attempts to match a detected identification signal, such as identification code 76, with one of predetermined authorized identification codes 96 and 114 in memory element 100. When controller 58 detects a match, controller 58 again automatically actuates enable relay 62, which in turn actuates latching relay 64.

However, since the driver wishes to override system 52, it is incumbent upon the driver to activate override switch 60 which causes latching relay 64 to remain latched, or closed, following actuation of latching relay 64 by enable relay 62. In addition, activation of override switch 60 energizes indicator 92 to provide visual or audible indication to the driver that override switch 60 is activated. Override switch 60 is subsequently deactivated so that system 52 is no longer bypassed by the driver deactivation, or switching off, override switch 60.

Accordingly, in response to the momentary closure of enable relay 62, causing latching relay 64 to be latched to a closed position, and sustained closure of override switch 60, even when vehicle 20 is turned off, a circuit path is formed from ignition switch output 53 through input 51 and latching relay 64 to output 55 and to input 57 of starter motor 34. This circuit path allows system 52 to be bypassed or overridden so that whenever key 48 (FIG. 1) is inserted in ignition switch 32 and turned, engine 28 (FIG. 1) of motor vehicle may be started, without first detecting return signal 74 having an identification code 76 that matches one of predetermined authorized identification codes 96 and 114. Thus, transponder circuit 56 need not be turned over to an unauthorized individual such as a garage attendant or mechanic.

In summary, the present invention teaches of an automatic vehicle theft prevention system that protects a vehicle against theft without the need for human intervention. In particular, the vehicle theft prevention system employs proximity sensing using an interrogator circuit and transponder circuit system to selectively enable relays interconnected between an ignition switch and a starter motor of an ignition system the vehicle. The transponder circuit is separate from the ignition key of a vehicle so if a thief obtains a key for the vehicle, the thief will be prevented from readily starting the vehicle. The automatic vehicle theft prevention system is readily installed and is a cost effective, aftermarket device for protecting older vehicles from theft.

Although the preferred embodiments of the invention have been illustrated and described in detail, it will be readily apparent to those skilled in the art that various modifications may be made therein without departing from the spirit of the invention or from the scope of the appended claims.

What is claimed is:

1. An automatic vehicle theft prevention system for selectively enabling an ignition system of a vehicle, said ignition system being operable using an ignition key, and said system comprising: an interrogator circuit including a signal generator for generating an excitation signal and an antenna coupled to said signal generator for radiating said excitation signal and receiving a return signal;
    a transponder circuit separate from said ignition key for detecting said excitation signal and radiating said return signal, said transponder circuit modulating said excitation signal to produce said return signal containing an identification code for said transponder circuit;
    a controller in communication with said antenna for detecting said identification code in said return signal;
    a relay actuated to an enable mode by said controller when said controller detects said identification code, said relay being actuated to enable said ignition system; wherein said ignition system includes an ignition switch activated by said ignition key, and said system further includes a latching relay actuated in response to a momentary actuation of said relay when said controller detects said identification code, said latching relay being adapted to remain latched until said ignition switch is deactivated; further comprising an override switch in communication with an input of said latching relay wherein activation of said override switch causes said latching relay to be latched to continuously enable said ignition system; and wherein activation of said override switch causes said latching relay to remain latched to continuously enable said ignition system only following actuation of said latching relay by said relay.

2. A system as claimed in claim 1 wherein said transponder circuit is a mobile radio frequency identification (RFID) data carrier including a memory element for storing said identification code.

3. A system as claimed in claim 1 wherein said excitation signal provides power to said transponder circuit.

4. A system as claimed in claim 1 wherein said controller comprises: an input for receiving a predetermined authorized identification code; and a memory element in communication with said input for storing said predetermined authorized identification code, said controller actuating said relay to said enable mode in response to a match between said detected identification code and said predetermined authorized.

5. A system as claimed in claim 4 wherein said input is a data port configured for interconnection with an external programming device, said external programming device providing said predetermined authorized access code.

6. A system as claimed in claim 4 wherein said input is said antenna configured for radio frequency communication with an external programming device, said external programming device providing said predetermined authorized access code.

7. A system as claimed in claim 4 wherein: said identification code is a first identification code; said predetermined authorized identification code is a first predetermined authorized identification code; said input of said controller is configured to receive a second predetermined authorized identification code; said memory element is configured to store said second predetermined authorized identification code; and said system further comprises a second RFID data carrier separate from said ignition key for detecting said excitation signal and radiating said return signal, said second RFID data carrier including a memory element for storing a second identification code for said second RFID data carrier, and said second RFID data carrier modulating said excitation signal to produce said return signal containing said second identification code, wherein when said controller detects a match between said detected second identification code and said second predetermined authorized identification code, said relay is actuated to said enable mode to enable said ignition system.

8. A system as claimed in claim 1 wherein said relay is actuated to a disable mode whenever said controller fails to detect said identification code.

9. A system as claimed in claim 1 wherein said ignition system includes an ignition switch and a starter mechanism, and said system further comprises: an input configured to be coupled to an output of said ignition switch, and said input being in communication with an input of said relay; and an output in communication with an enable mode output of said relay and configured to be coupled to an input of said starter mechanism.

10. A system as claimed in claim 1 further comprising an indicator in communication with an output of said override switch and energized when said override switch is activated.

11. A system as claimed in claim 1 wherein said antenna is configured for placement inside a passenger compartment of said vehicle.

12. An automatic vehicle theft prevention system for selectively enabling an ignition system of a vehicle, said ignition system being operable using an ignition key, and said system comprising:

an interrogator circuit including a signal generator for generating an excitation signal and an antenna coupled to said signal generator for radiating said excitation signal and receiving a return signal;

a mobile radio frequency identification (RFID) data carrier separate from said ignition key for detecting said excitation signal and radiating said return signal, said mobile RFID data carrier including a memory element for storing an identification code for said mobile RFID data carrier, said mobile RFID data carrier modulating said excitation signal to produce said return signal containing said identification code; a controller in communication with said antenna for detecting said identification code in said return signal;

a relay actuated by said controller to one of an enable mode and a disable mode, said relay being actuated to said enable mode to enable said ignition system in response to detection of said identification code, and said relay being actuated to said disable mode to disable said ignition system whenever said controller fails to detect said identification code; and a latching relay actuated in response to a momentary actuation of said relay when said controller detects said identification code, said latching relay being adapted to remain latched until said ignition switch is deactivated; an override switch in communication with an input of said latching relay wherein activation of said override switch causes said latching relay to remain latched to continuously enable said ignition system only following actuation of said latching relay by said relay; and an indicator in communication an output of said override switch and energized when said override switch is activated.

13. A system as claimed in claim 12 wherein said antenna is configured for placement inside a passenger compartment of said vehicle.

* * * * *